(12) United States Patent
Bellon et al.

(10) Patent No.: US 8,783,212 B2
(45) Date of Patent: Jul. 22, 2014

(54) ANIMAL COLLAR WITH INTEGRATED ELECTRONICS

(71) Applicants: Bart Bellon, Bethesda, MD (US); Michael Leighton, Bethesda, MD (US)

(72) Inventors: Bart Bellon, Bethesda, MD (US); Michael Leighton, Bethesda, MD (US)

( * ) Notice: Subject to any disclaimer, the term of this patent is extended or adjusted under 35 U.S.C. 154(b) by 0 days.

(21) Appl. No.: 13/756,359

(22) Filed: Jan. 31, 2013

(65) Prior Publication Data

US 2013/0233252 A1 Sep. 12, 2013

Related U.S. Application Data

(60) Provisional application No. 61/634,980, filed on Mar. 9, 2012.

(51) Int. Cl.
*A01K 15/02* (2006.01)

(52) U.S. Cl.
USPC ............................................ 119/720; 119/859

(58) Field of Classification Search
CPC ... A01K 15/021; A01K 12/022; A01K 15/02; A01K 27/009
USPC .......................... 119/720, 721, 719, 856, 859
See application file for complete search history.

(56) References Cited

U.S. PATENT DOCUMENTS

| | | | | |
|---|---|---|---|---|
| 4,876,674 A | * | 10/1989 | Parmely et al. | 119/859 |
| 4,898,119 A | * | 2/1990 | Tsai | 119/720 |
| 4,919,082 A | * | 4/1990 | Tsai | 119/720 |
| 5,054,428 A | * | 10/1991 | Farkus | 119/720 |
| 5,815,077 A | * | 9/1998 | Christiansen | 340/573.3 |
| 5,857,433 A | * | 1/1999 | Files | 119/720 |
| 6,019,066 A | * | 2/2000 | Taylor | 119/720 |
| 6,073,589 A | * | 6/2000 | Curen et al. | 119/720 |
| 6,079,367 A | * | 6/2000 | Stapelfeld et al. | 119/720 |
| 6,135,060 A | * | 10/2000 | So | 119/720 |
| 6,467,435 B2 | * | 10/2002 | Stapelfeld et al. | 119/720 |
| 6,575,120 B1 | * | 6/2003 | Stapelfeld et al. | 119/720 |
| 6,607,134 B1 | * | 8/2003 | Bard et al. | 235/472.01 |
| 6,712,025 B2 | * | 3/2004 | Peterson et al. | 119/721 |
| 6,764,012 B2 | * | 7/2004 | Connolly et al. | 235/462.45 |
| 6,814,293 B2 | * | 11/2004 | Curry et al. | 235/472.01 |
| 6,830,013 B2 | * | 12/2004 | Williams | 119/765 |
| 6,830,014 B1 | * | 12/2004 | Lalor | 119/859 |
| 6,860,240 B2 | * | 3/2005 | Kim et al. | 119/719 |
| 6,923,146 B2 | * | 8/2005 | Kobitz et al. | 119/721 |
| 6,970,090 B1 | * | 11/2005 | Sciarra | 340/573.1 |
| 7,017,524 B2 | * | 3/2006 | Gillis et al. | 119/719 |
| 7,042,438 B2 | * | 5/2006 | McRae et al. | 345/156 |
| 7,111,586 B2 | * | 9/2006 | Lee et al. | 119/719 |
| 7,252,051 B2 | * | 8/2007 | Napolez et al. | 119/718 |
| 7,267,082 B2 | * | 9/2007 | Lalor | 119/859 |
| RE39,931 E | * | 12/2007 | So | 119/719 |
| 7,409,924 B2 | * | 8/2008 | Kates | 119/720 |
| 7,421,979 B2 | * | 9/2008 | Kim | 119/721 |
| 7,552,699 B2 | * | 6/2009 | Moore | 119/719 |
| 7,559,291 B2 | * | 7/2009 | Reinhart | 119/720 |
| 7,562,640 B2 | * | 7/2009 | Lalor | 119/719 |
| 7,644,685 B2 | * | 1/2010 | Groh et al. | 119/856 |

(Continued)

*Primary Examiner* — Yvonne Abbott

(74) *Attorney, Agent, or Firm* — David H. Jaffer; Pillsbury Winthrop Shaw Pittman LLP

(57) ABSTRACT

The present invention provides an improved design for an animal collar with an integrated electronic device where the contact surface/points of the electronic device can be positioned in a way that is physically comfortable for the animal that wears the collar. The design of the electronic device as a whole does not compromise aesthetics while being unobtrusive and effective to receive control signals.

19 Claims, 11 Drawing Sheets

(56) References Cited

U.S. PATENT DOCUMENTS

| | | |
|---|---|---|
| 7,814,865 B2 * | 10/2010 | Tracy et al. ............ 119/720 |
| 7,845,311 B2 * | 12/2010 | So ............ 119/720 |
| 7,861,676 B2 * | 1/2011 | Kates ............ 119/720 |
| 8,011,327 B2 * | 9/2011 | Mainini et al. ............ 119/720 |
| 8,069,823 B2 * | 12/2011 | Mainini et al. ............ 119/718 |
| 8,342,135 B2 * | 1/2013 | Peinetti et al. ............ 119/721 |
| 8,477,037 B2 * | 7/2013 | So ............ 340/573.3 |
| 8,605,036 B1 * | 12/2013 | Kelly ............ 345/169 |

* cited by examiner

ANIMAL COLLAR WITH INTEGRATED ELECTRONICS

CROSS-REFERENCE TO RELATED APPLICATIONS

This Application claims priority to the U.S. Provisional Application No. 61/634,980, filed Mar. 9, 2012, which is incorporated herein by reference in its entirety.

TECHNICAL FIELD

This disclosure relates generally to the field of use of electronic devices for wirelessly controlling and/or tracking objects at a distance. Specifically, the disclosure relates to design of such an electronic device with a receiver integrated with a wearable item. The receiver is often communicatively coupled to another separate device, or another part of the same electronic device that sends control signals to the receiver to generate customizable outputs.

BACKGROUND

Conventional electronic collar-mounted receivers, automatic electronic stimulators, etc., provide remote/leash-free access to animals using communication via sound, vibration, and/or electronic stimulation at varying levels. Examples of these devices include remote animal-training collars, anti-bark collars, containment collars, hunting collars for dogs, that provide GPS/radio transmission, etc. The collar-mounted receivers/transmitters or electronically controlled collars presently available are typically encased in a hard plastic housing (usually box-shaped) with some sort of loop or tab, of plastic or metal to thread the collar through for attachment purposes. The components in a conventional receiver are stacked vertically to reduce surface area on the animal's neck. Because of the bulk of the device with two fixed contact points placed side by side, certain situations arise. First, gravity constantly pulls the box to its lowest position. This affects the effectiveness of the contact, because it either becomes loose, or pushes on the larynx of the dog, leading to discomfort. Because the housing has a propensity to fall to the same spot on the animal's body, there is often a rubbing that leads to necrosis, i.e. a blistering of the skin from constant friction at the same spot. Also, due to the horizontal fixed nature of the contacts on a large bulky housing, present day electronic animal collar receivers are difficult to use on small dogs. The large inflexible box does not wrap well around small necks, and this makes proper contact difficult. Additionally, there is minimal or no ability to customize output of the receiver. Stimulus levels are factory set on present day electronic animal collar-mounted receivers. For example, if level two is too low and level three is too strong, there is not much scope to adjust the level to something in between that can be customized for a particular animal. Moreover, the bulky receiver design is aesthetically compromising, and often leads to unwanted interrogation/curiosity, which may interfere with the psychological dynamics between the animal and the animal handler/owner, and/or between the handler/owner and other human beings, e.g. spectators Transmitters used to communicate with the receivers are typically large and bulky as well with extending long antennae (several inches long). Transmitters are usually in the hand of the operator, worn around the neck with a lanyard, or put in a pocket.

What is needed is a better design of receiver and/or transmitter to obviate the known problems discussed above.

SUMMARY

The present invention relates to an electronic collar that can be used on an animal to provide remote communications and/or automatic electronic reaction in response to a stimulus, such as vibration, sound, etc. The invention provides new structural and functional set up for collar-mounted electronics that are, among other things, easier to customize, avoid a common problematic medical issue (necrosis), lighter in weight, and more discreet in structure, resulting in optical, functional and psychological advantages over conventional solutions currently available in the market.

The collar on which the electronics are mounted is normally used on the neck of an animal, but the scope of the invention is not limited to use on the neck only. Often the receivers are threaded through a strap which goes around the waist, chest, or other part of the body of an animal.

The invention attains performance improvements by, among other things, controlling the strength of electrical signal to provide a multi-level customized output, enabling reliable wireless transmission between a transmitter and a receiver, diminishing the bulk of the electronics, providing more physical comfort to the animal by conforming to the natural shape of the animal's body and/or by flexibly adjusting contact points. At the same time, the design addresses aesthetic and psychological issues involved in animal handling.

These and other aspects of the present disclosure will now be described by way of example with reference to the detailed disclosure and the accompanying figures. Furthermore, persons skilled in the art will understand, in view of the present disclosure, that though the words 'receivers' and 'transmitters' are used to refer to certain specific components in the exemplary embodiments described with illustrations, this invention covers electronic device configurations that are not purely a 'receiver' or a 'transmitter', but are configured to work in a manner that produces the desired result of delivering electrical/electronic signal to an animal. For example, the scope of this invention covers 'bark collars' with integrated electronics, which are neither transmitters nor receivers, but pick up stimulus signal when an animal barks. In other words, in certain configurations, 'receiver' and 'transmitter' can be co-located. Similarly, in certain situations, 'transmitter' and 'receiver' may be used interchangeably to describe two devices that are physically separated, but are communicatively coupled with each other, especially when bi-directional communication is supported between the two devices. For example, collars with GPS/tracking electronics may be considered as 'transmitter' collars that send signals to a 'receiver' device possessed by a handler/owner.

DETAILED DESCRIPTION

Figure 1:
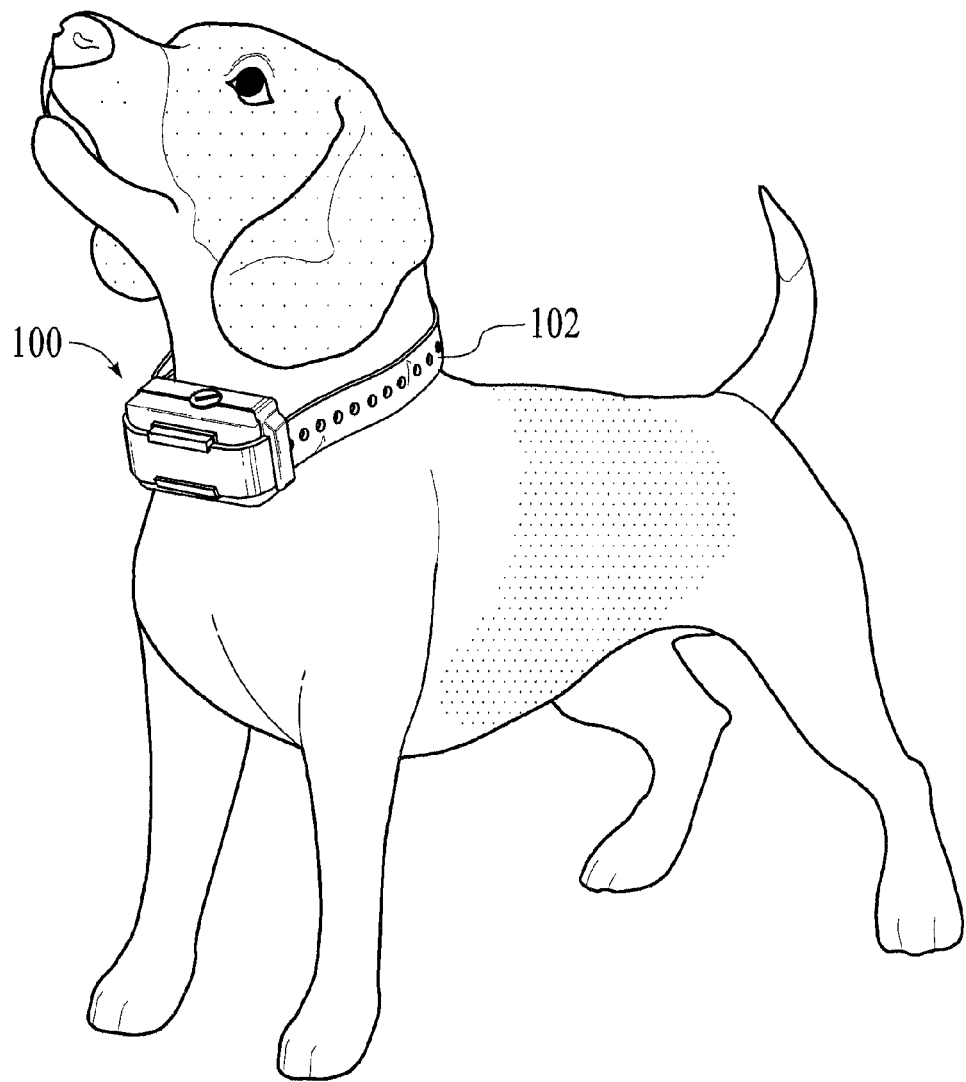
FIG. 1 shows a conventional receiver mounted on a dog collar.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Embodiments of the present invention incorporate electronic circuitry into collar-mounted receivers and/or electronic stimulators which respond to various forms of stimulus signals, such as, vibration, sound, etc. Tracking devices, such as GPS chips and associated circuitry may be integrated within the collar-mounted receivers.

As discussed above, one of the advantages of the design of the present invention is the ability to provide controlled amount of electricity to give customized output at each level. For example, in one embodiment, the transmitter can be designed to give 18 levels of output over a 150 milliamp range. The interval between levels can be small, medium, or large, continually varying, or a combination of discrete and continually varying. There may be a default factory setting, which the transmitter can be reset back to, as required. In certain embodiments, logic circuits can be included to achieve several functionalities, such as, pre-programming what level of electricity is to be delivered, maintaining a historic log of the type of signal/level of signal, periodically deleting the log automatically or by user intervention, etc. Transformers may be included on either or both of the transmitter and the receiver side to adjust the level of electricity. An additional battery/power source may be required to give extra energy to the added transformer and to add to devices' active life.

When transformers are added on the receiver and/or transmitter side, it is possible to maintain a constant level of electricity for negative and positive poles of the contact points, so that in essence the contact points become interchangeable, and the need to have fixed contact points is largely obviated. This design also opens up the possibility of using multiple contact points on each side of the electronics to deliver distributed signal rather than sending the entire signal through just two (one positive and one negative) contact points. The multiple contact points' advantage is harnessed in the design of extendors, as described in greater detail subsequently.

A second aspect of the invention is to ensure reliable transmission (via Bluetooth, Zigbee or other short-range communication protocol) between a transmitter and the receiver while still diminishing the bulk of the transmitter.

A third aspect of the invention is to provide a flexible structure for the collar-mounted receiver that is more comfortable for the animal that is wearing it. For example, a rubbery flexible molding used for products commercially known as "Chameleon", marketed by Bart Bellon's company "BCBB" via Dogsport.be, a company based in Belgium, is used in the embodiments of the present invention to hold the electronics in a comfortable location on the animal's body. The material used for the molding may be a flexible polymer such as a polyamide. The battery and the electronics of the receiver (on a printed circuit board or integrated circuit chip) are placed next to each other instead of being stacked vertically, so the external shape and the look of the collar remains thin and sleek. Yet another aspect of the present invention is to achieve flexibility of positioning of the contact points that deliver electronic signals to the animal. This enhances physical comfort and can be utilized more effectively for the animal's behavioral monitoring/training purposes. With the present invention, it is possible to easily move or change the number of contact points to customize response and to eliminate habitual rubbing leading to necrosis. Unlike other collars available in the market, contacts can be affixed vertically or in any other spatial arrangements, and the number of contacts can be varied too. Specially designed "extendors" may be used to beneficially use the effects of gravity, where the electronics are pulled to the lowest point and the contacts consequently are pulled closer to the sides of the neck, when an animal wears the collar-mounted receiver of the present invention.

Moreover, the sleek, inconspicuous design of the present invention is suitable for being integrated with a flat collar, so there is no unseemly "box" visible to attract unwanted attention. Overall the collar (and the receiver integument) is optimized for comfort, durability, functionality and aesthetics.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Overall, the present invention incorporates modern electronics into collar-mounted receivers, transmitters, and electronic stimulators which respond to received stimulus signals, such as vibration or sound. This may also incorporate GPS or other tracking devices within collar-mounted receivers.

FIG. 1 shows a dog wearing a typical "boxy" design of a receiver 100, that is mounted on a collar 102 around the dog's neck. As discussed before, this boxy design is too conspicuous, and due to the bulk, is adversely affected by gravitational pull, where contact points of the receiver detach from the dog's body. Therefore, a higher level of electricity may need to be provided, and a repetitive reliable operation is not achieved.

Figure 2:
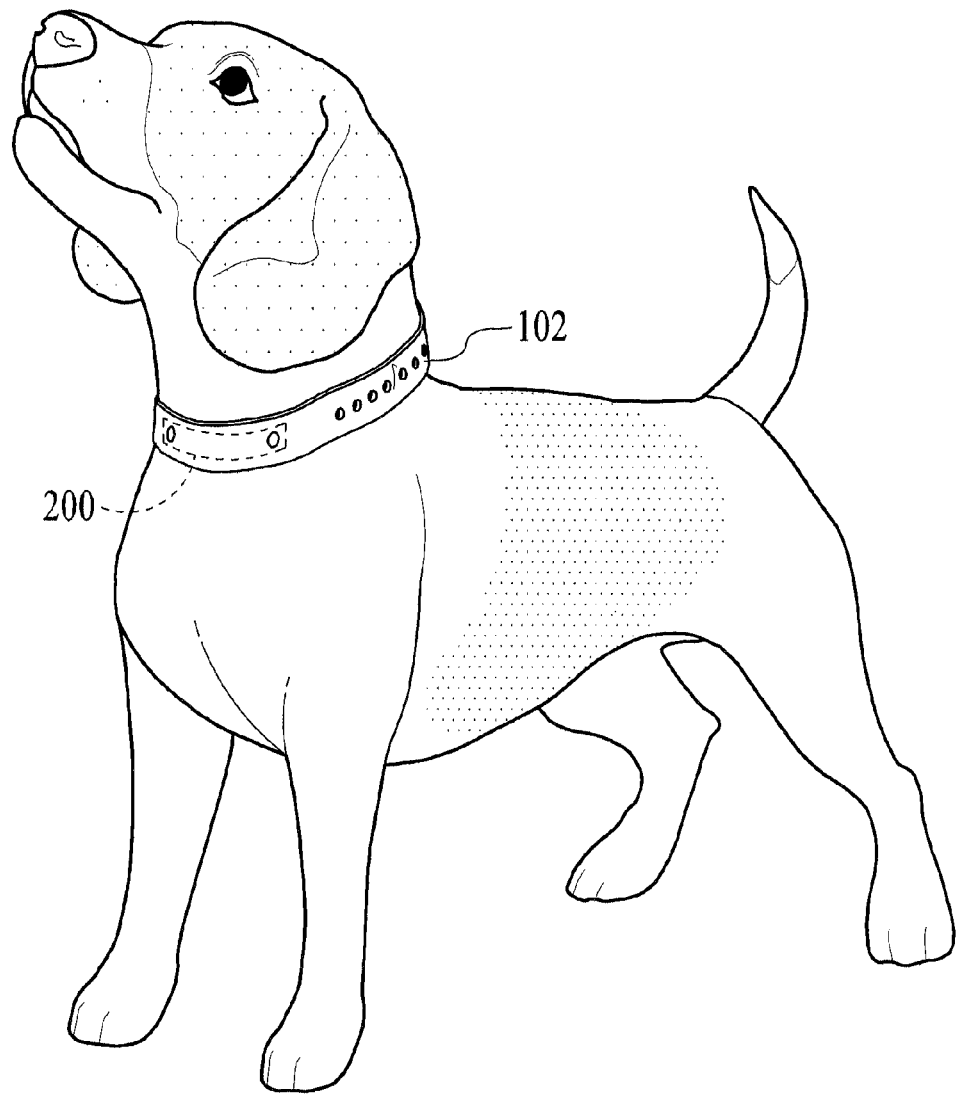
FIG. 2 shows an embodiment of a collar-mounted receiver, according to the present invention.

FIG. 2 shows the receiver 200 of the present invention (showed with dotted line, as it is not visible externally) affixed to the same type of collar 102. Due to the reduced bulk and other design improvement discussed herein, the effectiveness of the placement of the contacts with respect to the dog's body is vastly enhanced.

Figure 3:
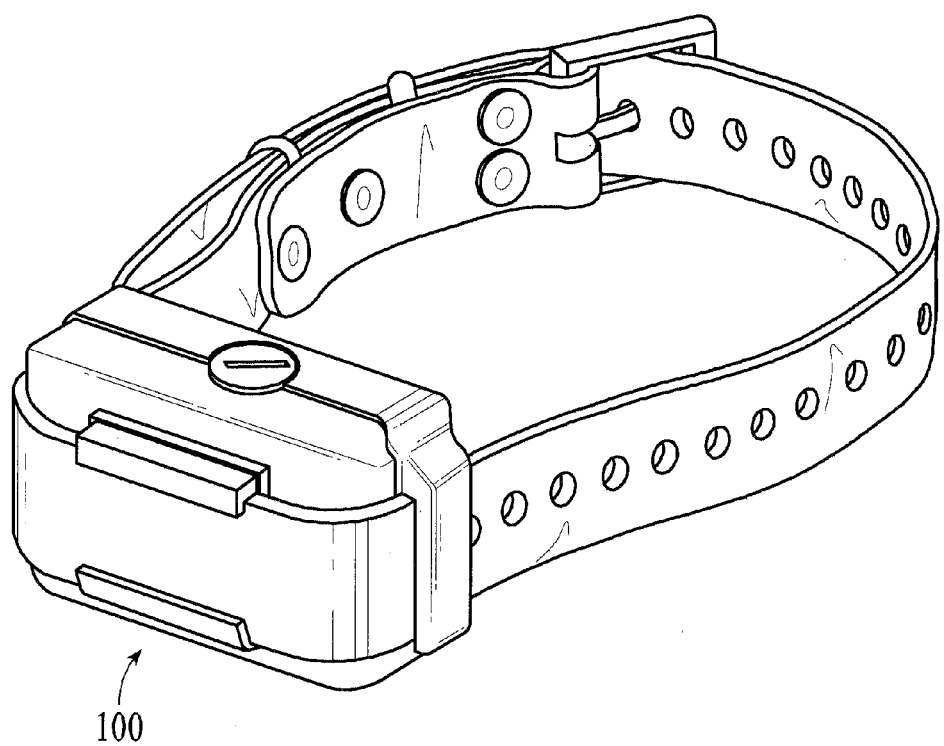
FIG. 3 shows a more detailed view of a conventional collar-mounted receiver shown in FIG. 1.

FIG. 3 shows a more detailed view of a conventional collar-mounted receiver shown in FIG. 1.

Figure 4:
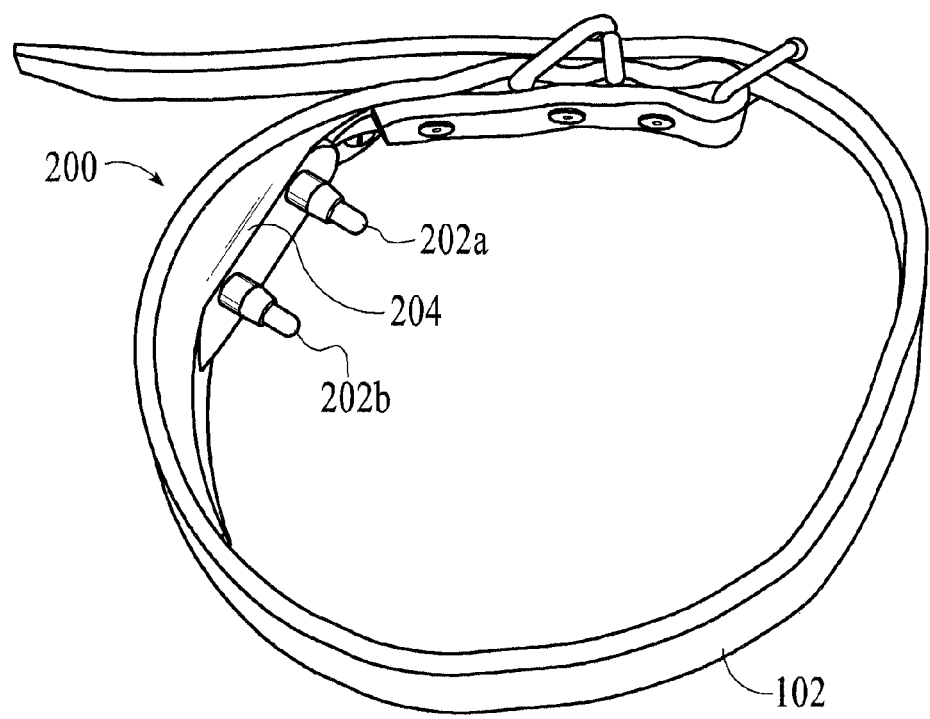
FIGS. 4-6 show the embodiment of the collar-mounted receiver of the present invention affixed detachably to various types of standard collars available in the market.
Figure 5:
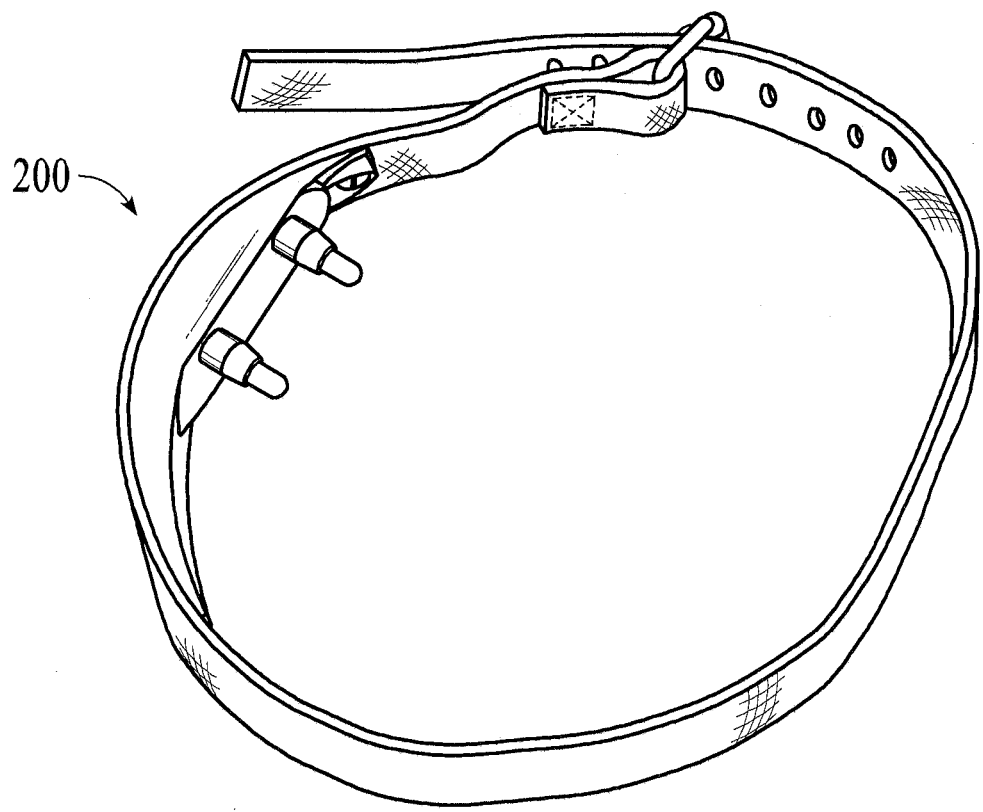
Figure 6:
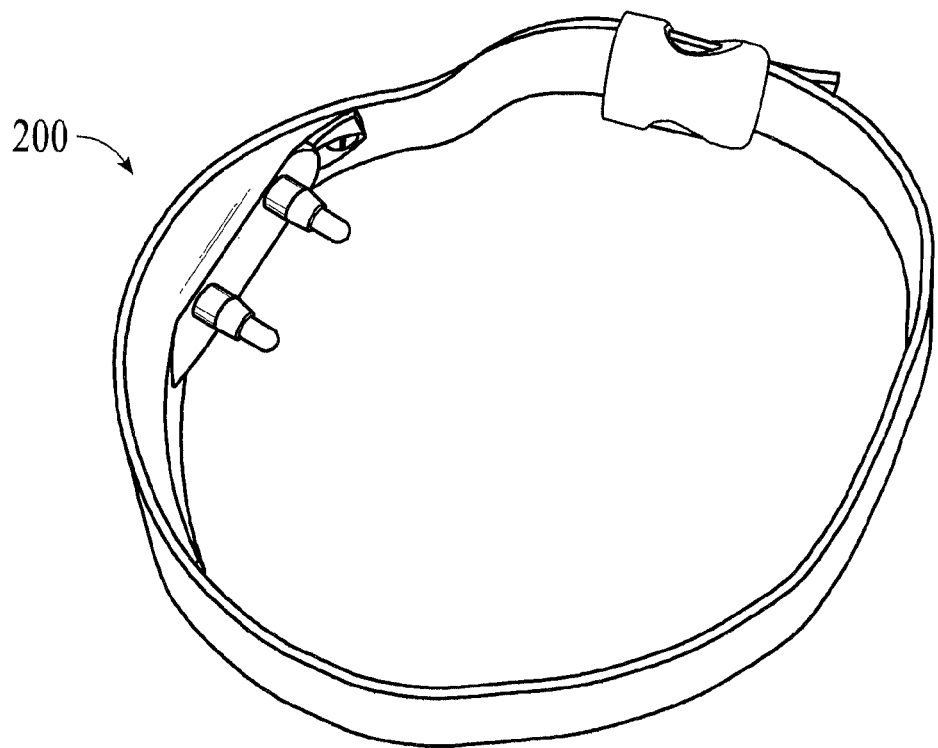

FIG. 4 shows a view showing components of the receiver 200 of the present invention. Receiver 200 comprises a body 204 (preferably made of flexible injection-molded or otherwise manufactured semi-malleable material) that encases the internal electronic circuitry with two contact points 202a and 202b extending therefrom. Receiver 200 can be permanently affixed or detachably affixed to the collar 102. FIGS. 5 and 6 show that the same receiver 200, if detachably attached, can be used with various designs of collars, belts, straps, etc., that can be adjusted in size to customize comfort level for the animal that wears it.

Figure 7:
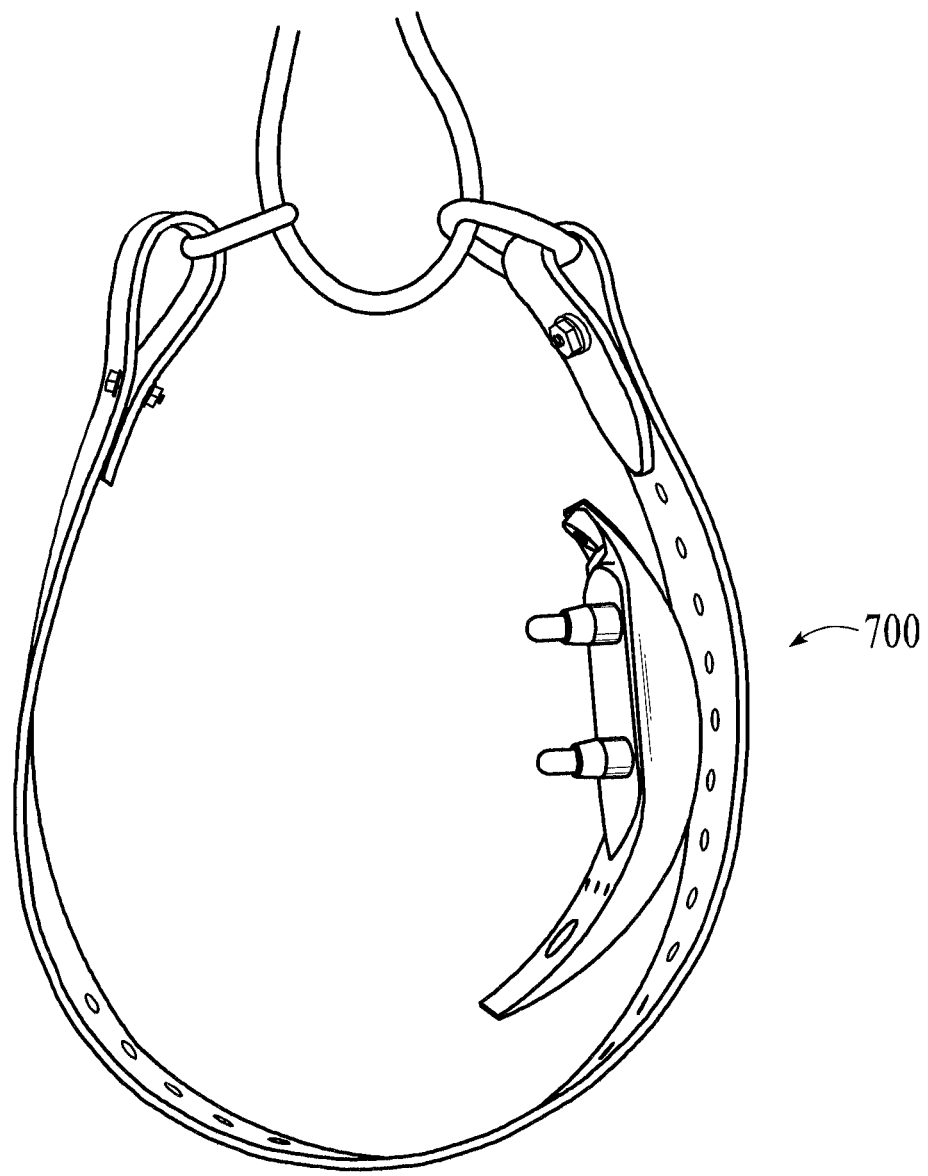
FIG. 7 shows the embodiment of the collar-mounted receiver of the present invention, affixed flexibly to a collar for the purpose of providing greater conformity and comfort to the animal that wears the collar.

FIG. 7 shows an embodiment 700 where the receiver can be moved to any number of locations on a collar (affixation with two screws). This particular receiver/collar affixation can be placed any number of places on an animal's body with the receiver secured at a chosen location. This ensures a conformal effective and precise fit to the animal's body. The curvature and elasticity of the injection-molded body can be controlled to ensure better fit. Flexible electronics inside the injection molding may be further useful for this purpose.

Figure 8:
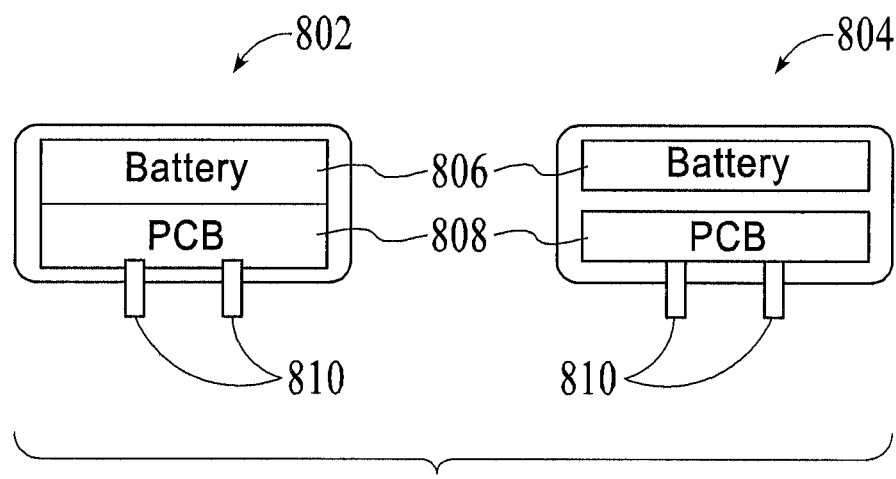
FIG. 8 shows typical placement of components within the conventional electronic receiver presently available on the market.

FIG. 8 shows two embodiments for a conventional collar-mounted receiver (such as the receiver 100) presently available in the market, that use a hard plastic casing with fixed symmetrical, replaceable contact points 810 arranged side by side on the casing. To reduce contact surface area, battery 806 and the printed circuit board (PCB) 808 are typically stacked vertically, either the battery being within the same circuit board (as shown in embodiment 802), or the battery having its separate chamber (as shown in embodiment 804) but coupled to the PCB electrically.

Figure 9:
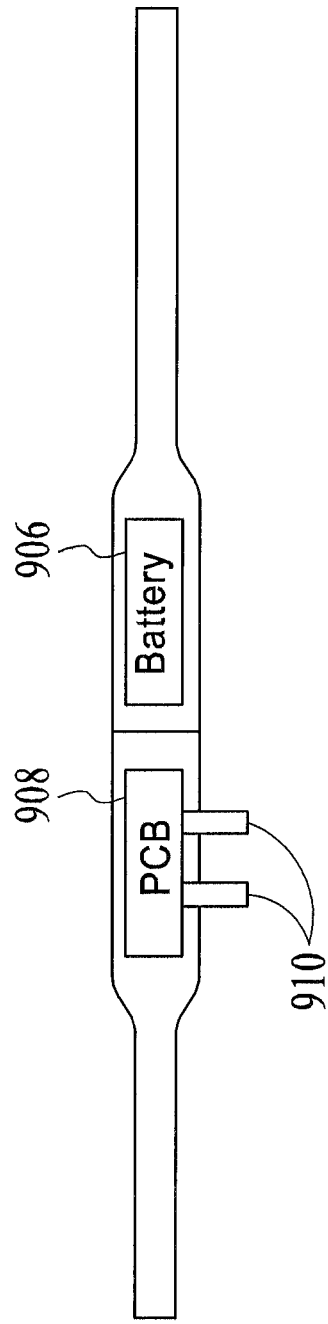
FIG. 9 shows placement of components within the electronic receiver of the present invention, with fixed contact points.

The present invention provides an alternative design, shown in FIG. 9, where the PCB 908 and battery 906 are stacked horizontally. The contact points 910 may still be horizontal, but due to the overall spatial arrangement and diminished size of the electronics, the effectiveness of the contact is better than what is achieved with the configurations shown in FIG. 8. The PCB and battery are integrated side by side into a rubberized plastic injection-molded body that accommodates a longer length because the injection-molded portion is allowed to slightly bend (for example, around the neck of a dog). The injection molded body is virtually unbreakable (compared to brittle plastic casing) and the electronics are protected. Additionally, the injection-molded portion may have an oval asymmetry where the contacts are placed in an asymmetric fashion on the collar-mounted receiver, resulting in a fit that is more comfortable for the animal's body shape. For example, due to the oval asymmetry, the contacts fit naturally beside the larynx when placed around the neck rather than sitting and pressing on the larynx as in the case of traditional collars. This plastic injection-molded portion holding the electronic and structural components can be integrated directly on the inside of any collar (made of plastic, elastic, leather, etc.). Due to the intentional inconspicuous design, for example, injection-molding integrated with the internal surface of a regular leather collar, external aesthetic appeal remains intact. For example, a leather collar with injection-molded components in the inside is virtually indistinguishable from a plain leather collar.

Figure 10:
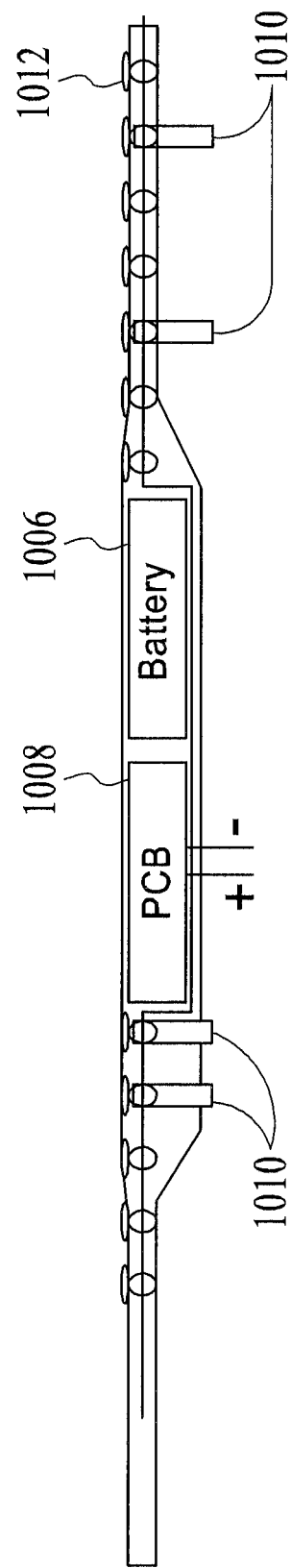
FIG. 10 shows a configuration for the placement of an extendor enabling movement of the position of the contact points with respect to the collar, according to the present invention.
Figure 11A:
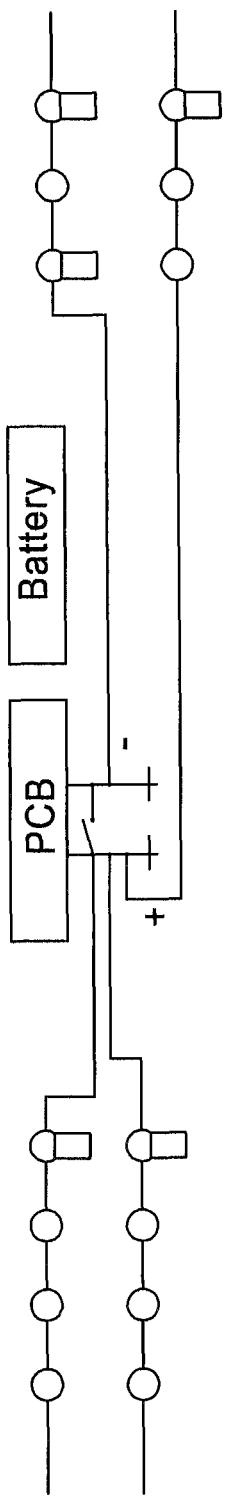
FIGS. 11A-11B show examples of "dual-extendor" configurations, according to embodiments of the present invention.
Figure 11B:
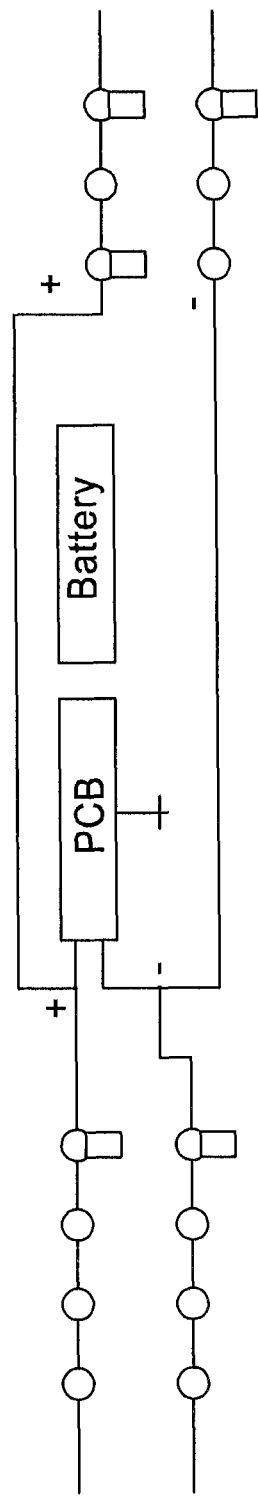

FIG. 10-11 show design of 'extendors' to further improve the effectiveness of the contact points. FIG. 10 shows a 'single-extendor' configuration, while FIGS. 11A-11B show 'dual-extendor' configurations. One of the main advantages of the 'extendor' is to flexibly distribute the contact points (i.e. to accommodate multiple contact points delivering electric signal of the same polarity while being distributed at various spatial locations).

The difference between FIG. 9 (no extendor) and FIG. 10 (including extendor) is that the contact pins 1010 in FIG. 10 can be adjusted to any of the predefined positions 1012 around the PCB 1008 and battery 1006 by moving the extendor in parallel to the collar. The positive pole of the contact goes to one side of the PCB, and the negative pole may go to the other side. A special type of washer may be built into or on top of the collar to create the predefined positions for the contacts. The extendors are affixed movably to the collar to minimize slippage. Persons skilled in the art will understand that the extendors can be manufactured (and/or sold) separately, and can be adjusted to be affixed with a variety of standard/custom collars available in the market. In other words, standalone versions of the extendors can be designed with a versatile use in mind. Properly designed extendors can be coupled to electronics either integrated with a collar, or the electronics can be integrated with the extendors, and the extendor/electronics combination is integrated with the collars.

Dual-extendor type configurations shown in FIGS. 11A-B offer even more flexibility in arranging the contact points, including vertically arranging the contacts rather than the horizontal arrangement shown in FIG. 10. This way, both positive and negative poles may be arranged on either side of the PCB, with variable numbers of positive and negative depending on what is most effective and suitable. The flexibility in design of the extendors may be useful not only in terms of controlling the length of the charge path of the electrical signal, resulting in the effectiveness of the signal delivered to the animal, but it may also help in terms of complying with the country/region-specific regulations involving safe levels of electrical signals that are legally allowed to be delivered.

The Chameleon does not have to be mounted or fixed on any collar. In one embodiment the plastic injection molding can be used to form the entire collar with various options to close the collar (e.g. buckle, snap, elastic, clip, etc.). By adjusting the dimension of the collar by fastening mechanisms such as buckle, snap, clip etc., the contacts can be snugly placed and stabilized around an animal's body. In a further embodiment, the entire injection-molded collar can be sleekly integrated into any other type of standard collar (such as a leather collar).

Figure 12:
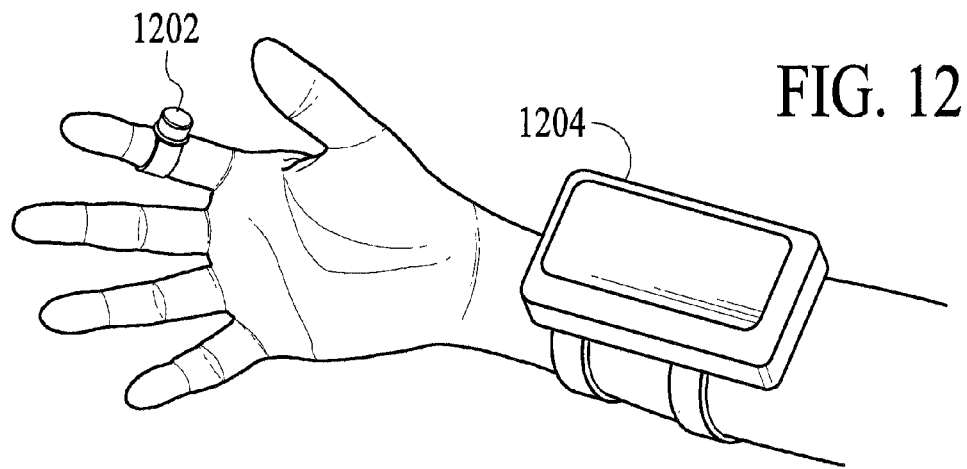
FIG. 12 shows a transmitter mounted on a hand with a Bluetooth finger ring, according to one embodiment of the present invention.

As discussed before, the collar-mounted receiver receives signals from a transmitter. FIG. 12 shows an embodiment where a transmitter has two parts, a main portion 1204 (mounted on a hand/arm) housing the electronic circuit that can generate command signals that are transmitted to a finger-mounted portion 1202 via wireless connection (such as Bluetooth). This design may obviate the need for long extended antennae seen in conventional transmitters. Command signals are sent to the collar-mounted receiver when the finger-mounted portion 1202 is actuated/activated.

Figure 13A:
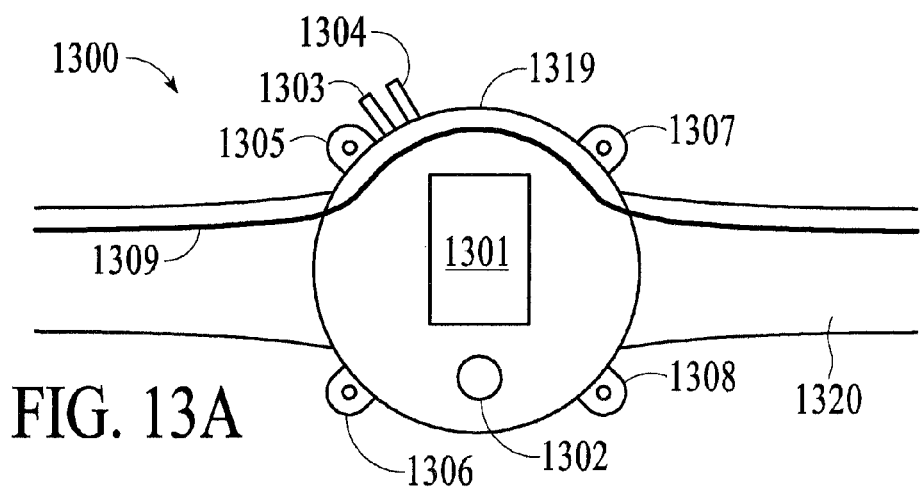
FIGS. 13A-B show a wrist-watch-type transmitter with built-in antennae, according to another embodiment of the present invention.
Figure 13B:
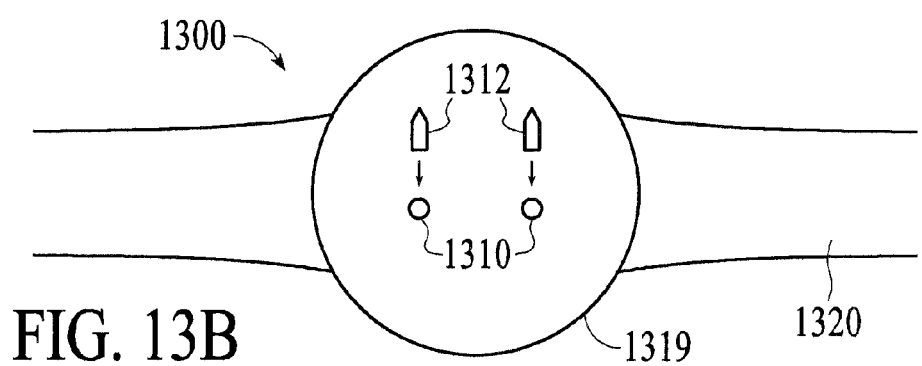

An even sleeker design for the transmitter 1300 adopts the configuration of a wrist-watch as shown in FIGS. 13A-B having a body 1319 and a strap 1320. Specifically, FIG. 13A shows a front view and FIG. 13B shows a rear view of the transmitter 1300. This design eliminates the possibility of any blockage in wireless connection between the Bluetooth finger transmitter and the main transmitter. With the wrist transmitter, the operation of the transmitter is hands-free. No pockets/lanyard is needed to carry the transmitter. This design is compatible with the finger transmitter 1202 shown in FIG. 12. FIG. 13A shows the front view of the transmitter, and FIG. 13B shows the back view. One of the goals of this design is to diminish the bulk of the transmitter: The wrist-mounted transmitter of the new invention has a built-in antennae (the thick black line 1309 which may be connected to a PCB) so that no external antennae sticking out like in the case of a conventional transmitter. The components in the body 1319 of the transmitter may include a display (1301), a programming (mode control) button 1302, electrical level control switches 1303 and 1304 (e.g. 1303 for increasing level, 1304 for decreasing level), buttons 1305, 1306, 1307 and 1308 for various levels of frequency, and fixing points 1310 to attaching contacts 1312 for charging and/or other purposes. Contacts 1312 may be removably attached at the fixing points 1310. The wrist-watch-type transmitter may be made lighter by not including a power source within its body, but using docking stations/charging stations that work similar to the conventional mobile device chargers. Proper interface design (i.e. controlling the pin count) becomes of paramount interest if standardized connectors are to be used.

Overall, the transmitter and receiver work in unison to deliver a controlled amount of electricity to the animal wearing the collar so that the animal handler can remotely communicate/control the behavior of the animal, and optionally track the animal.

Various alterations, improvements, and modifications of the systems and embodiments may occur and are intended for those skilled in the art, though not expressly stated herein. These alterations, improvements, and modifications are intended to be suggested by this disclosure, and are within the spirit and scope of the exemplary aspects of this disclosure.

For example, the present description is written mostly using a dog collar as an illustrative example, where the pet collar with the integrated electronics aims to build a better relationship between a pet-handler/pet-owner and the pet. However, it can be understood that the device can be useful for animal trainers, veterinarians, zoo-keepers, professional performers conducting shows involving performing animals, recreational hunters, animal control officers and the like.

Certain aspects of the design may be useful as well for tracking/monitoring inanimate objects, such as luggage, bikes or other personal items, and/or, merchandise in a commercial environment (e.g. industrial assembly line, warehouse, department store etc.).

Additionally, theft detection of living/non-living objects, health and behavior monitoring of persons or animals, event-logging and information transmission regarding certain activities (such as physical movement indicating transgression beyond a predetermined boundary of geographic location and/or indicating an unusual behavior) can be corollary functionalities that can be implemented using the embodiments of the electronic devices disclosed herein. Appropriate alert messages can be generated using standard technologies that can be integrated with the disclosed embodiments.

In certain embodiments, a sensor included in the electronics may have the ability to receive remote commands to arm/disarm the electricity delivery mechanism (e.g. using a key fob), enable/disable data transmission, etc.

In certain embodiments, mechanical energy harvesting from the physical movement of the animal can be used to charge a battery included in the electronic device. The battery/integrated power sources may be rechargeable. The transmitter may wirelessly charge the receiver and/or receive harvested (or otherwise obtained) energy from the receiver. In certain embodiments, power-aware logic may be incorporated in the electronic design. For example, the receiver/transmitter may go into a 'hibernation' mode when the animal is detected to be in a 'calm' state. In this mode, the receiver may 'wake up' only periodically to check whether the transmitter is trying to communicate. This way wastage of power can be prevented to a significant extent. The transmitter/receiver may also be turned off manually using a standard switch if designed accordingly.

The receiver/transmitter may include the following components and functionalities. A GSM module and associated antenna can receive/retrieve data from cellular (for SMS) and 3G/EDGE (for IP data) network access. Communication protocols, including, but not limited to Bluetooth, RF, WiFi, etc., may be used for communication between the transmitter and the receiver. For more expanded communication capabilities, a GSM module and associated antenna can be used to receive/retrieve data from cellular (for SMS) and 3G/EDGE (for IP data) network access. A positioning system module (e.g. SiRF Star GPS) and associated antenna may also be included with associated circuitry (e.g. circuit to lock onto satellites, access to satellites from difficult locations, etc.). An accelerometer for physical movement capture may be a micro-electro-mechanical (MEMS) sensor. A processor and associated memory (e.g. RAM/ROM) receives data from the sensor and positioning modules and provides the monitoring and control functionality that should become apparent from the foregoing descriptions.

In the description, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

It should be appreciated that in the foregoing description of embodiments of the present disclosure, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the appended claims are hereby expressly incorporated into this detailed description.

The invention claimed is:

1. A device for wireless communication between an animal and its handler, the device comprising:
    an electronic receiver having a plurality of electrical contact points extending therefrom, the receiver mounted on a fastener worn by the animal, such that the receiver substantially conforms to a contour of a body part of the animal, ensuring improved contact between the extended contact points with the animal's body, the contact points being used to deliver an electrical output into the animal's body in response to a command signal communicated by the animal's handler in a wireless manner, wherein the electronic receiver further includes a battery and a PCB that can receive the command signals, with the battery and the PCB stacked horizontally, and wherein the plurality of contact points is arranged horizontally along an extendor having a series of predefined locations to affix the contact points.

2. The device of claim 1, further including:
an electronic transmitter possessed and operated by the animal's handler that generates the command signal.

3. The device of claim 2, wherein the electronic transmitter comprises:
a main body portion of the transmitter that houses circuitry to generate the command signal; and
a finger-mounted portion that communicatively couples to the main body portion of the transmitter.

4. The device of claim 3, wherein the main body portion of the transmitter is mounted on a wrist or arm of the handler, or put inside a pocket, or attached to a lanyard to be worn around a body part of the handler.

5. The device of claim 3, wherein an antenna for the main body portion of the transmitter comprises an in-built PCB.

6. The device of claim 2, wherein the electrical output into the animal's body is controlled in discrete levels.

7. The device of claim 2, wherein the electrical output into the animal's body is configured to be varied continually to customize to the animal's requirement.

8. The device of claim 1, wherein the PCB and the battery are encapsulated into a flexible molding.

9. The device of claim 1, wherein the contact points, after being affixed, can move within a limited spatial range.

10. The device of claim 1, wherein the receiver is attached to the inside surface of the fastener within an integument.

11. A device for wireless communication between an animal and its handler, the device comprising:
an electronic receiver having a plurality of electrical contact points extending therefrom, the receiver mounted on a fastener worn by the animal, such that the receiver substantially conforms to a contour of a body part of the animal, ensuring improved contact between the extended contact points with the animal's body, the contact points being used to deliver an electrical output into the animal's body in response to a command signal communicated by the animal's handler in a wireless manner, wherein the electronic receiver further includes a battery and a PCB that can receive the command signals, with the battery and the PCB stacked horizontally, and wherein the plurality of contact points is arranged vertically or horizontally along two extendors having a series of predefined locations to affix the contact points.

12. The device of claim 11, further including:
an electronic transmitter possessed and operated by the animal's handler that generates the command signal.

13. The device of claim 12, wherein the electrical output into the animal's body is configured to be varied to customize to the animal's requirement.

14. The device of claim 11, wherein the contact points, after being affixed, can move within a limited spatial range.

15. The device of claim 11, wherein the receiver is attached to the inside surface of the fastener within an integument.

16. A device for wireless communication between an animal and its handler, the device comprising:
an electronic receiver having a plurality of electrical contact points extending therefrom, the receiver mounted on a fastener worn by the animal, such that the receiver substantially conforms to a contour of a body part of the animal, ensuring improved contact between the extended contact points with the animal's body, the contact points being used to deliver an electrical output into the animal's body in response to a command signal communicated b the animal's handler in a wireless manner wherein the electronic receiver further includes a battery and a PCB that can receive the command signals, with the battery and the PCB stacked horizontally, and wherein an extendor with predefined locations for contact points is affixed moveably on the fastener such that locations of the contact points are adjusted.

17. The device of claim 16, further including:
an electronic transmitter possessed and operated by the animal's handler that generates the command signal.

18. The device of claim 17, wherein the electrical output into the animal's body is configured to be varied to customize to the animal's requirement.

19. The device of claim 16, wherein the receiver is attached to the inside surface of the fastener within an integument.

* * * * *